US 6,691,841 B2

(12) United States Patent
Otake et al.

(10) Patent No.: US 6,691,841 B2
(45) Date of Patent: Feb. 17, 2004

(54) SHOCK ABSORBER WITH LEVELING FUNCTION

(75) Inventors: Koji Otake, Gifu (JP); Osamu Miyatani, Gifu (JP); Yukio Hayakawa, Wako (JP); Ryosuke Fujiya, Wako (JP); Kiyoshi Nakahara, Wako (JP)

(73) Assignees: Kayaba Kogyo Kabushiki Kaisha, Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/190,863

(22) Filed: Jul. 8, 2002

(65) Prior Publication Data

US 2003/0010586 A1 Jan. 16, 2003

(30) Foreign Application Priority Data

Jul. 10, 2001 (JP) .................................... 2001-208760
Jul. 31, 2001 (JP) .................................... 2001-230849

(51) Int. Cl.[7] ................................................ F16F 9/46
(52) U.S. Cl. ................ 188/274; 188/276; 188/322.21; 267/34; 267/64.15
(58) Field of Search ............................ 188/299.1, 274, 188/278, 322.5, 322.19, 322.321; 267/34, 64.11, 64.15, 64.16, 64.26, 64.28

(56) References Cited

U.S. PATENT DOCUMENTS

| 2,805,854 | A | * | 9/1957 | Gaebler ................... 267/64.19 |
| 3,860,787 | A | * | 1/1975 | Strobach ..................... 392/457 |
| 4,054,295 | A | * | 10/1977 | Elliott ..................... 280/6.159 |
| 6,170,621 | B1 | * | 1/2001 | Nakahara et al. ........... 188/274 |
| 6,179,098 | B1 | * | 1/2001 | Hayakawa et al. ......... 188/274 |
| 6,247,683 | B1 | * | 6/2001 | Hayakawa et al. ...... 267/64.11 |
| 6,328,144 | B1 | * | 12/2001 | Hayakawa et al. ...... 188/299.1 |

FOREIGN PATENT DOCUMENTS

EP           1 020 307      * 7/2000

* cited by examiner

Primary Examiner—Jack Lavinder
Assistant Examiner—Bradley T King
(74) Attorney, Agent, or Firm—McGlew and Tuttle, P.C.

(57) ABSTRACT

Heat of an electrothermal part of a heater can be transmitted indirectly and efficiently to a pressure medium.

A tubular case 6 having one end portion connected to a piston rod 2 airtightly and the other end portion slidably placed in contact with the outer circumference of a cylinder 1 is provided, a mounting hole 15 is formed within a holder 4 for closing an open end on the piston rod 2 connecting side of the case 6, and an electrothermal part 13*a* of a heater plug 13 is fitted into the mounting hole 15 directly or through a heat conductivity collar 16.

5 Claims, 4 Drawing Sheets

SHOCK ABSORBER WITH LEVELING FUNCTION

BACKGROUND OF THE INVENTION

The present invention relates to a shock absorber with a leveling function mounted between the body and an unspring member of an automobile.

In general, the shock absorber is provided with a cylinder, and a piston rod, one end of which is mounted on a piston which slidably moves within the cylinder, and movably inserted into the cylinder, one out of the cylinder and the piston rod being connected to the unspring member, the other being connected to the body so as to obtain the damping force with respect to the vibrations of the unspring member.

On the other hand, there has been proposed a configuration in which a leveling cylinder is interposed between the shock absorber and the body or the unspring member, so as to perform leveling so that when the level is lowered, pressure fluid is supplied to the cylinder from a pressure source to raise the level. In this case, since a pump driven by the engine is used as a pressure source, the burden of the engine is heavy and the efficiency of fuel cost becomes worsened.

There has been further proposed a configuration in which a pressure medium which is changed into gas or liquid depending on the temperature is sealed into the leveling cylinder, a supply of current to a heater is controlled by means of a switch responsive to variation of the level, and the pressure medium is heated or cooled to thereby enable raising or lowering of the level. According to this proposal, the pump is not used, the burden of the engine is small, and the efficiency of fuel cost is good.

However, in the shock absorber with a leveling function as described above, since the electrothermal part of the heater is in direct contact with the pressure medium, an electrothermal area of the electrothermal part with respect to the pressure medium is so small that the pressure medium is heated in part intensively to generate bubbles around the electrothermal part, and a vapor film is formed by the bubbles to generate the burn-out phenomenon, as a result of which the heat conductivity with respect to the whole pressure medium lowers rapidly. As a consequence, there were problems such that the leveling control fails to be carried out with high accuracy, and in addition, the heater becomes deteriorated, and very offensive gases adversely affecting on seals or the like become generated.

SUMMARY OF THE INVENTION

The present invention has been accomplished paying attention to the conventional problems as noted above. It is an object of the invention to provide a shock absorber with a leveling function capable of, without placing an electrothermal part of a heater in direct contact with a pressure medium, transmitting heat of the electrothermal part to the medium sufficiently and effectively.

For achieving the aforementioned object, a shock absorber with a leveling function according to the present invention comprises a tubular case one end of which is connected to a piston rod airtightly and the other end thereof comes in contact with the outer circumference of a cylinder slidably, a holder for closing an open end on the piston rod connecting side of the case, a pressure chamber formed between the holder, the cylinder, the piston rod and the case to accommodate a pressure medium, and a heater plug in which an electrothermal part is fitted into a mounting hole formed in the thick-wall of the holder, wherein the electrothermal part is heat-generated to heat and vaporize the pressure medium in contact with the holder to raise pressure within the pressure chamber thus enabling leveling due to the relative displacement of the cylinder and the piston rod.

In this case, the electrothermal part is fitted into a mounting hole through a heat conductivity collar, and the heat conductivity collar is molded of copper, aluminum or other materials of good thermal conductivity.

DETAILED DESCRIPTION OF THE PREFERRED EMBODIMENTS

Figure 1:
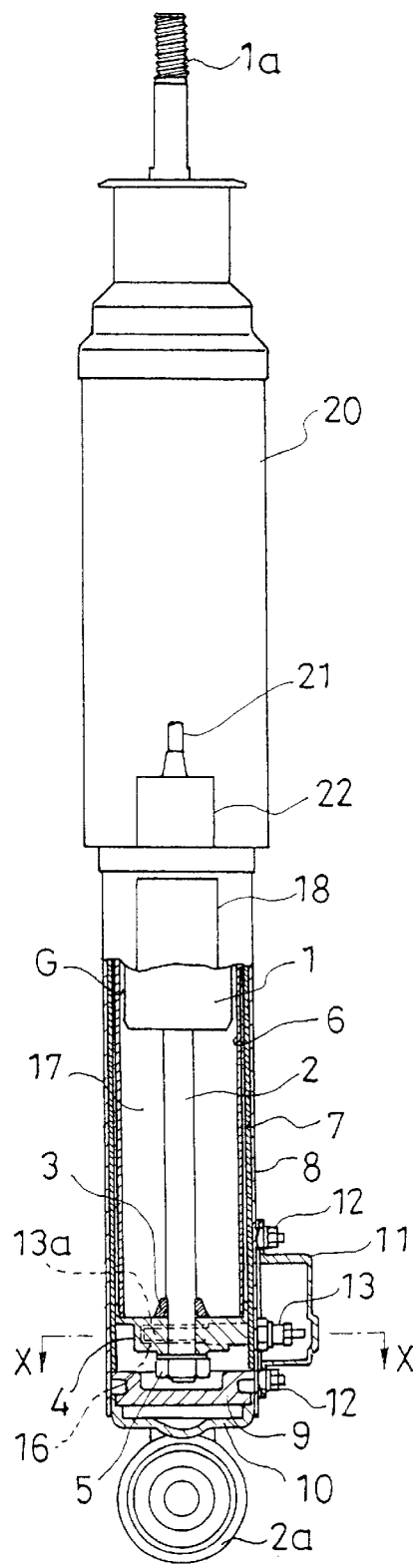
FIG. 1 is a front view showing a shock absorber with a leveling function according to one embodiment of the present invention with a part cutaway.

One form of the embodiments according to the present invention will be explained hereinafter with reference to the drawings. FIG. 1 is a front view showing a shock absorber with a leveling function according to one embodiment of the present invention with a part cutaway. In the figure, reference numeral 1 designates a cylinder which is the body of the shock absorber, in which one end of a piston rod 2 is mounted on a piston which is slidably moved within the cylinder 1. An eye 1a is provided on the end of a cylinder cover 20 associated with the upper end of the cylinder 1, and the eye 1a enables to be mounted on the body. Further, an eye 2a is provided on a lower cap 10 at the lower end of an outer shell 8 that can be moved in and out of the cylinder cover 20, and the eye 2a can be mounted on the axle of an unspring member.

A stopper 3 is fitted into a spigot portion at the lower end of the piston rod 2, a holder 4 is inserted into the lower end of the piston rod 2 so as to come in contact with the lower end surface of the stopper 3, and the holder 4 is secured to the piston rod 2 together with the stopper 3 by means of a nut 5 screwed into the lower end of the piston rod 2. It is noted that on the holder 4 is provided a mounting hole 15 into which is fitted a heater plug 13 described later as a heater.

The lower end of a case 6 is airtightly secured to the upper surface of the outer circumference of the holder 4, and approximately the upper half portion of the case 6 covers the outer circumference of approximately the lower half portion of the cylinder 1 in a fixed gap G. On the upper end portion of the case 6 is provided a collar and a seal member (both of which are not shown) so as to close the gap G airtightly. Because of this, the case 6 is airtightly and slidably inserted into the cylinder 1.

The lower end portion of an insulating resin pipe 7 encircling the outer circumference of the case 6 is fitted into the outer circumferential portion of the holder 4, and the lower cap 10 is mounted on the lower end of the resin pipe 7 through a lower cover 9 formed of insulating material. Further, a cylindrical outer shell 8 is fitted on the outer circumferential side of the resin pipe 7. The upper portion and the lower portion of a heater cover 11 in the shape of a rectangular container as viewed from the side are mounted on the outer circumferential lower portion of the outer shell 8 by means of screw members 12, 12 formed from a bolt and a nut.

Figure 3:
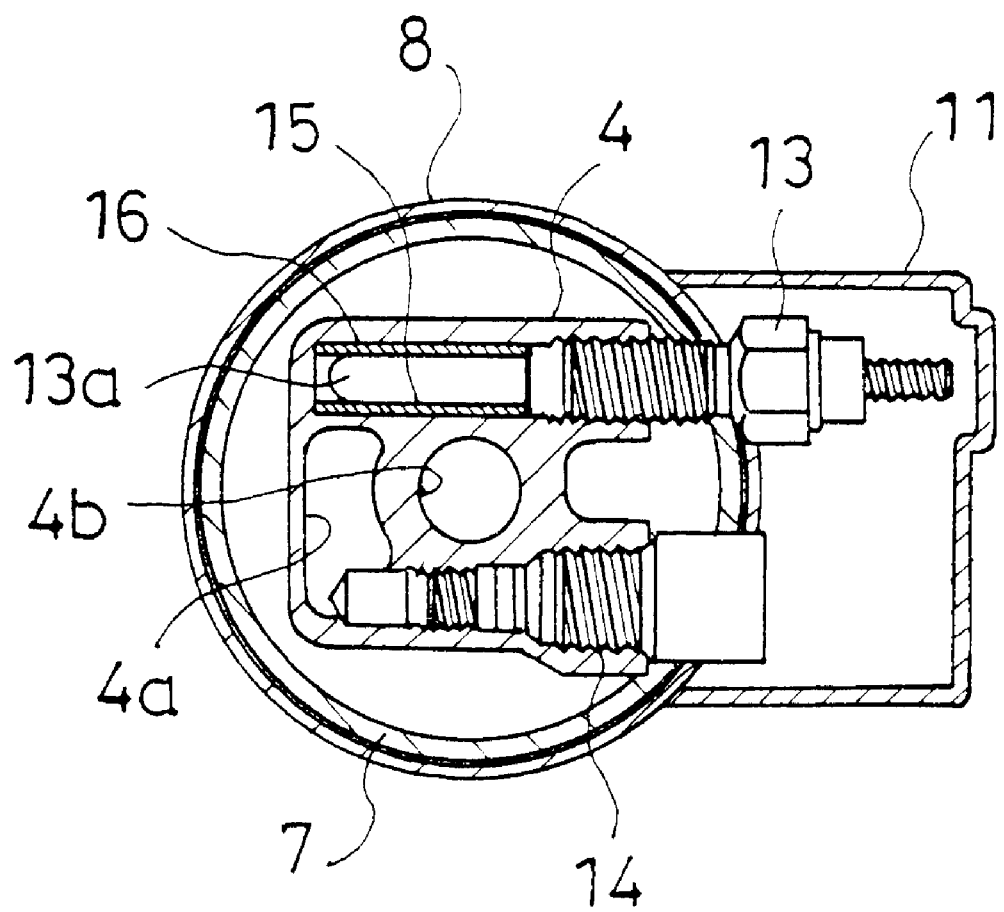
FIG. 3 is an enlarged sectional view taken on line X—X of FIG. 1.

Further, reference numeral 13 designates a heater plug used as a heater to heat a pressure medium, which heater plug 13 is mounted extending through the outer shell 8 and the resin pipe 7 facing within the heater cover 11. Furthermore, the heater plug 13 is inserted into the mounting hole 15 provided in the holder 4 and is horizontally held, as shown in FIG. 3. The holder 4 is formed with a notch hole 4a opened to an upper pressure chamber 17, and within the notch hole 4a faces the end portion of a pressure medium injecting valve 14 which extends through the outer shell 8 and the resin pipe 7 and is inserted into the body of the holder 4. It is noted that the heater plug 13 and the valve 14 are arranged on the sides opposite to each other about a piston rod mounting hole 4b within the holder 4. The extreme end of the heater plug 13 is inserted into the mounting hole 15 and is located in the vicinity of the notch hole 4a.

Here, the axial central portion of the heater plug 13 is screwed into the tapered mounting hole 15 provided in the holder 4, but an elastic heat conductivity collar 16 formed of materials of good heat conductivity, for example, such as copper, or aluminum is closely inserted over a fixed length into the outer circumference of an electrothermal part 13a provided on the extreme end of the heater plug 13. It is noted that the heat conductivity collar 16 forms for example, a wound tubular shape which slightly reduces in diameter toward one end, and the heat conductivity collar 16 is made using a material softer than the holder 4 to thereby absorb a working error or an assembling error. Further, heat of the electrothermal part 13a is transmitted to the holder 4 through the heat conductivity collar 16, and the pressure medium is heated by the holder 4 to thereby enable preventing local overheating of the pressure medium and the burn-out phenomenon (that is, the condition of forming the vapor film caused by bubbles of the pressure medium produced around the electrothermal part 13a) resulting therefrom from occurrence. Accordingly, it is possible to avoid the lowering of heat conductivity, the deterioration of the electrothermal part caused by overheating, and the chemical decomposition of the pressure medium. Further, since the electrothermal part 13a is inserted into the mounting hole 15 of the holder 4 and is not in direct contact with the pressure medium but is indirectly heated, even if the heater plug 13 is pulled out, no leakage of the medium occurs, and in case where the heater plug 13 is deteriorated or broken, its replacement is easily done. Further, for the heat conductivity collar 16, material of high heat conductivity is used whereby heat of the electrothermal part is transmitted to the holder 4 efficiently.

Further, the notch hole 4a is communicated with the pressure chamber 17 within the case 6 at the lower part of the cylinder 1, and the pressure chamber 17 is communicated with the gap G. Into the pressure chamber 17 is sealed a pressure medium having a low boiling point, for example, such as substitute fleon gases R134a, R152a, which changes into gas or liquid due to temperatures, which is indirectly heated and vaporized by the electrothermal part 13a of the heater plug 13 to act so as to raise internal pressure of the pressure chamber 17. By raising the internal pressure as described, the cylinder 1 is to be pressed upward with respect to the piston rod 2. The heater plug 13, the pressure chamber 17 and the pressure medium constitute leveling means along with a magnet or a lead switch described later.

Figure 2:
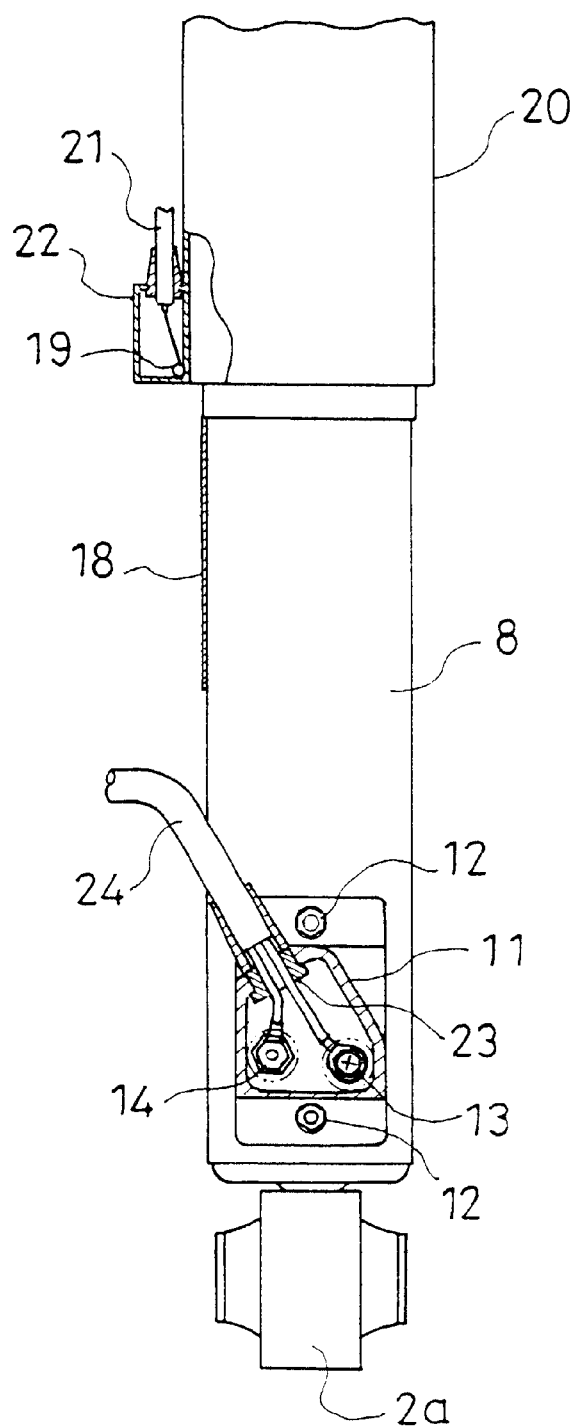
FIG. 2 is a side view showing the shock absorber with a leveling function of FIG. 1 with a part cutaway.

Further, on the piston rod 2 side, that is, in a region from the halfway to the lower portion of the outer shell 8 associated with the piston rod 2 through the holder 4 and the resin pipe 7, a magnet 18 is provided. On the other hand, on the cylinder cover 20 connected on the cylinder 1 side and vertically movably inserted into the outer circumference of the outer shell 8 are provided a lead switch 19 as shown in FIG. 2 for generating an ON or OFF signal as the magnet 18 moves closely or away, and a lead wire 21 for transmitting an ON or OFF signal resulting from an ON or OFF operation of the lead switch 19. It is noted that the lead switch 19 and the lead wire 21 are accommodated within the case 22 mounted on the outer circumference of the cylinder cover 20.

Within the heater cover 11 is introduced a harness 24 for supplying a current for heating or for controlling a valve to the heater plug 13 or the valve 14 through a rubber bush 23 extending through the interior or exterior of the heater cover 11, as shown in FIG. 2. It is noted though not shown, a thermister or the like for compensating for temperature of a heating circuit is provided within the heater cover 11 as necessary.

Figure 4:
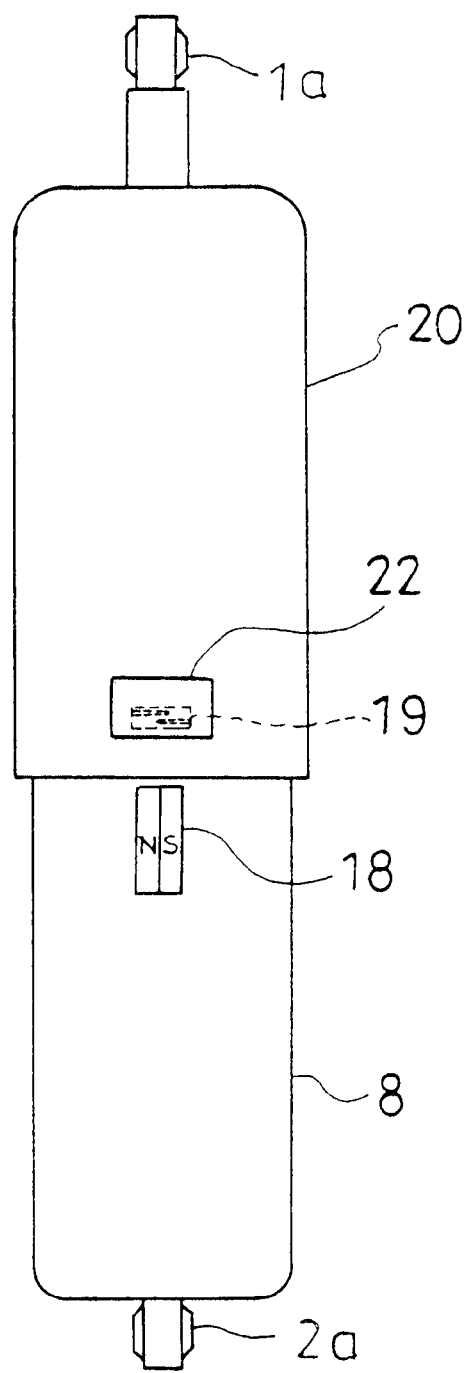
FIG. 4 is a front view showing the shock absorber with a leveling function conceptually showing a positional relation between a magnet and a lead switch in FIG. 1.

FIG. 4 is a front view conceptually showing a positional relation between the magnet 18 provided on the outer shell 8 and the lead switch 19 provided on the cylinder cover 20. Here, the lead switch 19 is arranged so that the lead shaft is in a horizontal direction, and the lead switch 19 is connected to an electric circuit including FET, a thermister, a resistor and the like not shown through the lead wire 21.

Further, for the magnet 18, a rubber magnet which is flexible as a whole and thin is used, which is attached to the outer circumferential surface of the outer shell 8. Further, the polarized pattern of the magnet 18 is, as shown in the figure, a pattern in which it is divided into an S-pole and an N-pole in a direction shown with respect to the lead-shaft direction of the lead switch 19, and two poles on one surface are polarized on the surface opposite to the lead switch 19. That is, the magnet 18 has a fixed length in an axial direction of the piston rod 2, the S- and N-poles are formed in a direction approximately perpendicular to the axial direction, and the surface formed with the S- and N-poles can be opposed to the lead switch 19.

The operation will be now explained. First, in case where a load exerting on the body is small, the spacing between the body and the unspring member is maintained sufficiently large, and therefore, as shown in FIG. 1, the piston rod 2 considerably projects in an extending direction from the inside of the cylinder 1. Accordingly, the outer shell 8 on the piston rod 2 side greatly projects in the extending direction from the inside of the cylinder cover 20 mounted on the cylinder 1 side.

Therefore, the magnet 18 is vertically greatly apart from the lead switch 19, and the lead switch 19 is not affected by the magnetic field or is less affected by the magnetic field of the magnet 18, maintaining its switch-off condition. In the off condition of the lead switch 19, since the circuit, for example, the FET is in an off condition, a supply of a current to the heater plug 13 is cutoff, and the electrothermal part 13a at the extreme end of the heater plug 13 is free from the heat-control.

On the other hand, when the load exerting on the body is large, and the body lowers exceeding a set level, the cylinder 1 moves down whereby the downwardly moving piston rod 2 moves into the cylinder 1, and the outer shell 8 also moves into the cylinder cover 20 accordingly. Because of this, the lead switch 19 comes close to the magnet 18, and at last, the lead switch 19 is affected by the magnetic field of the magnet 18 and is turned on. With this, the FET is turned on, and a current is supplied from the external power supply to the heater plug 13 whereby the electrothermal part 13a of the heater plug 13 is heated under the control of the FET.

Since the electrothermal part 13a is substantially in close contact over the whole surface with the inner circumference of the mounting hole 15 of the holder 4 through the heat conductivity collar 16 closely inserted thereinto, heat of the electrothermal part 13a is efficiently transmitted to the entire holder 4 through the heat conductivity collar 16 to promptly heat the pressure medium within the pressure chamber 17. By this heating, the pressure medium is promptly vaporized to immediately raise the internal pressure of the pressure chamber 17. Due to the raising of internal pressure of the pressure chamber 17, the cylinder 1 moves upward with respect to the case 6 on the piston rod 2 side. Because of this, the body having the eye 2b mounted thereon moves upward with respect to the unspring member having the eye 2a mounted thereon, the above upward movement continues till the lead switch 19 is turned off not being affected by the magnet 18, and the body stops at an up position of the set level. In this manner, the body is held at a height of a fixed level.

In this case, the magnet 18 is made to be a fixed vertical length at which the turn-on operation of the lead switch 19 is enabled to be continued during the time that two poles on one surface are polarized in which the magnet 18 is divided into the N-pole and S-pole at the center, and the level is less than the set level, whereby when the level is greatly lowered, the lead switch 19 is again turned off to enable preventing the level up-control from failing. The holder 4 is not heated through the heat conductivity collar 16, and the holder 4 can be also heated directly by the electrothermal part 13a.

As described above, the present invention has the following effects.

(1) The heater plug in which the electrothermal part is fitted into the mounting hole formed in the holder is provided to heat-generate the electrothermal part, and the pressure in the pressure chamber is raised by heating and vaporizing the pressure medium in contact with the holder to thereby enable leveling due to the relative displacement of the cylinder and the piston rod. Therefore, there can be obtained the effect that heat generated by the electrothermal part of the heater plug can be promptly transmitted with a large contact surface to the holder without concentrating the heat on a part, accordingly the heating and vaporization of the whole pressure medium in contact with the holder can be promoted efficiently, and the leveling control according to the level can be realized with high accuracy.

(2) Likewise, since the electrothermal part is fitted into the holder, it is not in direct contact with the pressure medium, and even if the heater plug is pulled out, it is possible to prevent the pressure medium from leaking. Further, even if the heater plug is deteriorated or broken, it can be replaced.

(3) Further, the electrothermal part is inserted into the mounting hole through the heat conductivity collar, and the heat conductivity collar is molded of copper, aluminum or other materials of good heat conductivity, whereby obtaining the advantage that heat of the electrothermal part can be transmitted to the holder by the constitution with low cost.

What is claimed is:

1. A shock absorber with a leveling function, the shock absorber comprising: a cylinder; a piston rod connected to a piston movable in the cylinder; a holder connected to an end of the piston rod; a tubular case airtightly and slidably inserted on an outside of the cylinder and along an outer circumference of the cylinder, the tubular case having an end thereof connected to the holder; a pressure chamber defined between the holder, the cylinder, the piston rod and the case, the pressure cylinder accommodating a pressure medium; a mounting hole formed in the holder; a heater plug having an extreme end with an electrothermal part inserted into the mounting hole; a notch hole formed on the holder to open to the pressure chamber; and a valve which is inserted into the holder, the valve for injecting a pressure medium, the valve having an extreme end facing an inside of the notch hole, the pressure medium in contact with the holder being vaporized by heat generated from the electrothermal part and pressure in the pressure chamber being raised by vaporization of the pressure medium to perform a leveling due to a relative displacement of the cylinder and the piston rod.

2. The shock absorber, with a leveling function, according to claim 1, further comprising a heat conductivity collar wherein the electrothermal part is inserted into the mounting hole through the heat conductivity collar, the heat conductivity collar being molded of copper or aluminum.

3. The shock absorber, with a leveling function, according to claim 1, further comprising: an insulating resin pipe encircling the outer circumference of the tubular case; an outer shell encircling an outer circumference of the resin pipe, the resin pipe and the outer shell being secured to an outer circumferential portion of the holder; a cylinder cover associated with the cylinder, the cylinder cover being movably inserted on an outside and along an outer circumference of the outer shell; and a lead switch and a magnet for controlling a flow of a current with respect to the heater plug, the lead switch and magnet being provided between the cylinder cover and the outer shell.

4. A shock absorber with a leveling function, the shock absorber comprising: a cylinder; a piston rod connected to a piston movable in the cylinder; a holder connected to an end of the piston rod; a tubular case airtightly and slidably inserted on an outside of the cylinder and along an outer circumference of the cylinder, the tubular case having an end thereof connected to the holder; a pressure chamber defined between the holder, the cylinder, the piston rod and the case, the pressure cylinder accommodating a pressure medium; a mounting hole formed in the holder; and a heat conductive collar forming a wound tubular shape, formed of copper or aluminum, the heat conductive collar being inserted into the mounting hole and having a reduced diameter toward one end, the pressure medium in contact with the holder being vaporized by heat generated from the electrothermal part and pressure in the pressure chamber being raised by vaporization of the pressure medium to perform a leveling due to a relative displacement of the cylinder and the piston rod.

5. A shock absorber with a leveling function, the shock absorber comprising: a cylinder; a piston rod connected to a piston movable in the cylinder; a holder connected to an end of the piston rod; a tubular case airtightly and slidably inserted on an outside of the cylinder and along an outer circumference of the cylinder, the tubular case having an end thereof connected to the holder; a pressure chamber defined between the holder, the cylinder, the piston rod and the case, the pressure cylinder accommodating a pressure medium; a mounting hole formed in the holder; and a heat conductive collar inserted into the mounting hole and made of a material softer than the holder, the pressure medium in contact with the holder being vaporized by heat generated from the electrothermal part and pressure in the pressure chamber being raised by vaporization of the pressure medium to perform a leveling due to a relative displacement of the cylinder and the piston rod.

* * * * *